Jan. 17, 1950  D. E. MATHEWS  2,494,715
SINE BAR
Filed April 13, 1944

INVENTOR
Donald E. Mathews
ATTORNEYS

Patented Jan. 17, 1950

2,494,715

UNITED STATES PATENT OFFICE 2,494,715

SINE BAR

Donald E. Mathews, Rockford, Ill.

Application April 13, 1944, Serial No. 530,772

2 Claims. (Cl. 33—174)

This invention relates to so-called sine bars which are used in machine shops and the like for determining and measuring angles. The method ordinarily used involves measuring the spacing relative to a reference line of two points spaced along the surface whose angle is to be determined and subtracting the distances thus measured to obtain the sine of the angle, the angle finally being found by consulting a sine chart.

The primary object of the present invention is to provide a sine bar which is more versatile in its use than the prior bars.

A more detailed object is to provide a novel sine bar construction having arcuate surfaces which may be positioned against the work in a multiplicity of different angular relations and presenting other arcuate surfaces conveniently located for contact with the measuring instruments.

A general object is to provide an improved sine bar which is simple and inexpensive in construction having surfaces which may be replaced or refinished conveniently.

Other objects and advantages of the invention will become apparent from the following detailed description taken in connection with the accompanying drawings in which Figure 1 is a perspective view of a sine bar embodying the novel features of the invention.

Figure 1:
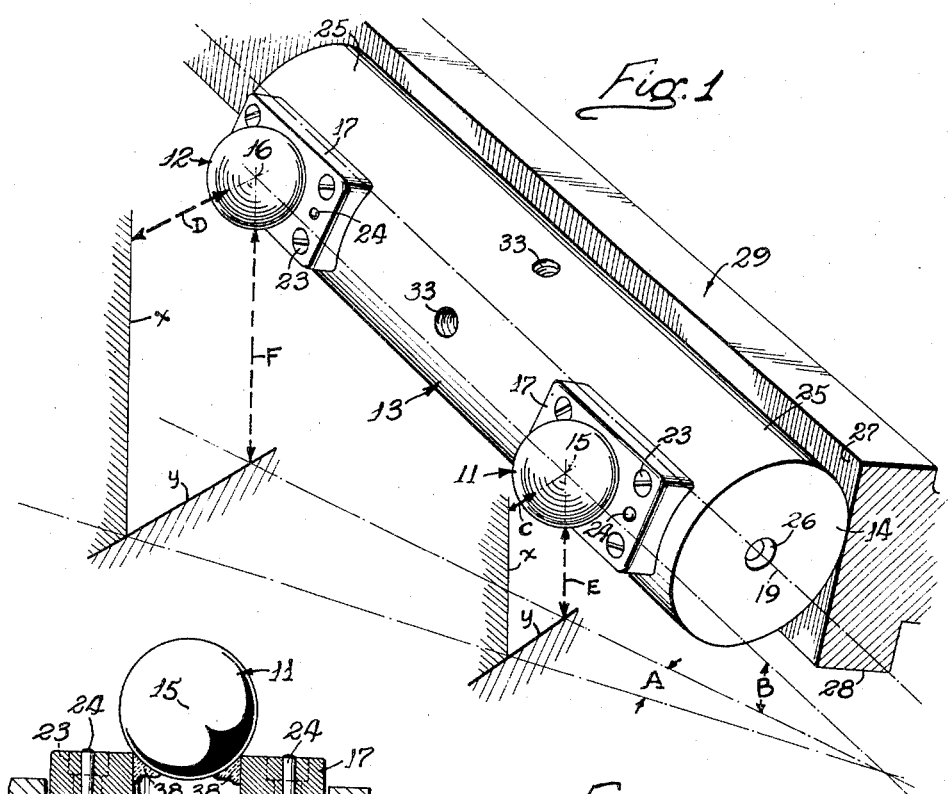
Figure 3:
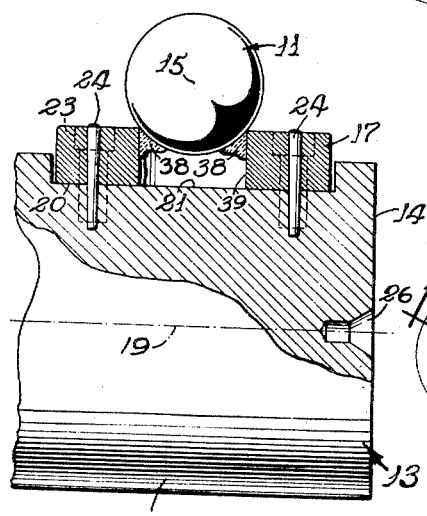
Fig. 3 is a fragmentary longitudinal section taken on the line 3—3 of Fig. 2.

While the invention is susceptible of various modifications and alternative constuctions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

Generally stated, the improved sine bar comprises an elongated member having longitudinally spaced and precisely formed arcuate surfaces of uniform radii lying on a cylinder, and spherical elements rigid with and projecting from one side of said member and disposed so that a line through the centers of the said elements is precisely parallel to the axis of said member.

In the present instance, the spherical elements are the surfaces or peripheries of balls 11 and 12 which are precisely formed and have exactly the same radii. The balls are rigid with and project laterally from a bar 13 preferably at spaced points disposed adjacent the end surfaces 14 of the bar which is a cylinder in this instance. Usually, the spacing between the centers 15 and 16 of the balls is in small or even numbers, such as five or ten inches, in order to simplify the calculations used in determining an angle. Each ball is carried by a support 17 which is secured to the bar 13 with the centers of the balls precisely equidistant from the axis 19 of the bar.

Figure 2:
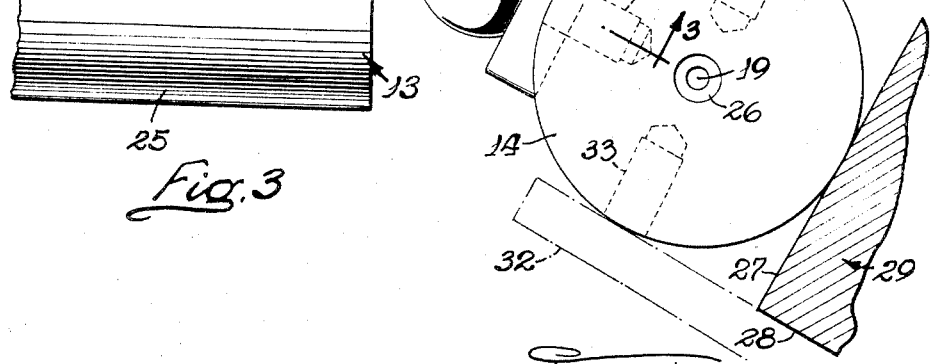
Fig. 2 is an end elevational view.

Preferably, the balls 11 and 12 are removably mounted on the bar to facilitate refinishing of the bar surfaces if the latter are damaged in service use. For this purpose, one side of each ball is permanently attached to a rectangular mounting plate 17. As shown in Fig. 2, this is accomplished by seating the ball in a hole 39 smaller in diameter than the ball and then forming welds 38 connecting the ball surface and the wall of the hole. One side of the plate provides a mounting area 20, shown as a plane surface, adapted to rest solidly against a complementary surface 21 sunk in the bar 13 adjacent one end thereof as by milling off a segment of the cylinder 13. Each plate 17 is removably attached to the bar by cap screws 23 and is also located accurately by tapered dowel pins 24 which facilitate exact relocation of the balls after removal of the latter for refinishing.

Herein, the periphery of the cylindrical bar constitutes arcuate surfaces 25 which are spaced longitudinally of the bar and angularly from the spheres 11 and 12 so that in the use of the sine bar they may lie in contact with a flat surface of the work to be measured with the spheres projecting from the work. The bar being a cylinder, the surfaces 25 are disposed precisely equidistant from the axis 19. Thus constructed, the bar may be placed against a work surface in an infinite number of angular positions to locate the spheres 11 and 12 in positions most convenient for measurement to a reference surface. Such location of the bar is not influenced by the presence of corners, points or sharp edges as in the sine bar now in general use.

It is desirable to refinish the arcuate surfaces 25 from time to time to remove dents, ridges or to straighten the same without necessitating the return of the instrument to the manufacturer. To this end, the mounting areas 21 are positioned relative to the surfaces 25 so that they will not interfere with the refinishing operation or be injured during the same. These areas are, therefore, disposed below the surfaces 25 and in this position are not contacted by the grinding wheel or other refinishing tools. Refinishing is preferably accomplished by grinding the surfaces 25 while the bar is supported on centers entering depressions 26 in the bar ends 14. Thus, the bar may be refinished readily with the desired accuracy using tools usually available in an ordinary machine shop. Provision is made for supporting the bar on gauge stands or the like during its use. For this purpose, tapped holes 33 are formed at points around the bar to receive screws carried by the stands or other supports.

The improved sine bar constructed as above described is considerably more versatile in its use than the bars now in common use, and, as a result, angle measurements in the construction and assembly of machines may be made or checked with greater speed and accuracy. This will be apparent from the typical illustration shown in Figs. 1 and 2. Suppose, for example, that it is desired to measure the angular spacing of a finished surface 27 on a workpiece 29 relative to horizontal and vertical surfaces Y and X respectively. To do this, the bar 13 is placed against the surface 27 in any angular position that will dispose the spheres 11 and 12 opposite the surfaces X and Y. A wide variation in this angular position is permitted by virtue of the arcuate character of the supporting surfaces 25 on the bar 13. Such supporting of the bar may be accomplished by a suitable stand having a part threading into one of the holes 33, or it may be accomplished by a plate 32 secured against a surface 28 on the workpiece 29.

With the bar thus positioned, it is only necessary to measure the shortest horizontal distances C and D between the surface X and the external surface of the spheres 11 and 12. These measured lines will, of course, pass through the centers of the spheres, so that by knowing the spacing of the sphere centers and the differences between the distances C and D the sine of the angle A may be ascertained. In a similar way, the shortest vertical distances E and F between the spheres 11 and 12 and the horizontal surface Y are measured, and from these, the angle B may be determined in a like manner.

It will be observed that in making an angle measurement with the improved sine bar, it is wholly unnecessary to angularly position the bar with a high degree of accuracy in order to bring some surface thereon into parallelism with the reference surface as is the case with ordinary sine bar constructions. Accordingly, the bar may be positioned quickly and conveniently, and the necessary measurements made with the required accuracy.

I claim as my invention:

1. A sine bar comprising, an elongated rigid member having arcuate surfaces of equal radii concentric with and spaced along a longitudinal axis of said member, mounting areas in said member spaced along the latter and disposed closer to said axis than said arcuate surfaces, a pair of spheres of equal radii, supports rigid with and projecting from said spheres and fitting against said areas to locate a line through the centers of the spheres precisely parallel to said axis, and means removably securing said supports rigidly against said areas.

2. A sine bar comprising, a cylindrical member having arcuate surfaces of uniform radii concentric with and spaced along the longitudinal axis of the member, mounting areas set in from the periphery of said member at points spaced along its length, and extending along chords of the cylinder spheres of equal diameter, and supports rigidly connected to each of said spheres having complementary mounting areas fitted against said first areas and disposed to space a line through the centers of said spheres from said axis and precisely parallel thereto.

DONALD E. MATHEWS.

REFERENCES CITED

The following references are of record in the file of this patent:

UNITED STATES PATENTS

| Number | Name | Date |
|---|---|---|
| 1,231,185 | Mueller | June 26, 1917 |
| 2,178,293 | Wogeck | Oct. 31, 1939 |
| 2,306,227 | Seidel | Dec. 22, 1942 |
| 2,326,562 | Rensen | Aug. 10, 1943 |